United States Patent
Blatz et al.

(10) Patent No.: US 10,476,712 B2
(45) Date of Patent: Nov. 12, 2019

(54) ACCELERATING ANTENNA RAMP-DOWN AND RELATED SYSTEMS

(71) Applicant: Microchip Technology Incorporated, Chandler, AZ (US)

(72) Inventors: Werner Blatz, Leingarten (DE); Thomas Janz, Ulm (DE); Robert Dvorszky, Deutschland (DE)

(73) Assignee: Microchip Technology Incorporated, Chandler, AZ (US)

(*) Notice: Subject to any disclaimer, the term of this patent is extended or adjusted under 35 U.S.C. 154(b) by 0 days.

(21) Appl. No.: 15/974,317

(22) Filed: May 8, 2018

(65) Prior Publication Data

US 2019/0190749 A1  Jun. 20, 2019

Related U.S. Application Data

(60) Provisional application No. 62/598,917, filed on Dec. 14, 2017.

(51) Int. Cl.
| | |
|---|---|
| *H04L 25/49* | (2006.01) |
| *B60R 25/24* | (2013.01) |
| *H04L 25/03* | (2006.01) |
| *H04B 17/10* | (2015.01) |

(52) U.S. Cl.
CPC ........ *H04L 25/4902* (2013.01); *B60R 25/245* (2013.01); *H04B 17/101* (2015.01); *H04L 25/0384* (2013.01); *B60R 2325/10* (2013.01)

(58) Field of Classification Search
None
See application file for complete search history.

(56) References Cited

U.S. PATENT DOCUMENTS

| | | | | |
|---|---|---|---|---|
| 8,493,192 | B2* | 7/2013 | Kofler | H04B 5/0062 340/426.16 |
| 8,855,554 | B2* | 10/2014 | Cook | H02J 5/005 455/41.1 |
| 8,965,287 | B2* | 2/2015 | Lam | G07C 9/00309 455/41.2 |
| 9,461,714 | B2* | 10/2016 | Cook | H02J 5/005 |
| 2005/0237163 | A1 | 10/2005 | Lee et al. | |
| 2010/0141389 | A1* | 6/2010 | Hagl | G06K 19/0707 340/10.1 |
| 2014/0114503 | A1 | 4/2014 | Ghabra et al. | |
| 2014/0210677 | A1 | 7/2014 | Fahlbusch et al. | |

OTHER PUBLICATIONS

International Written Opinion for International Application No. PCT/US2018/064543, dated Mar. 7, 2019, 8 pages.
International Search Report for International Application No. PCT/US2018/064543, dated Mar. 7, 2019, 4 pages.

* cited by examiner

*Primary Examiner* — K. Wong
(74) *Attorney, Agent, or Firm* — TraskBritt

(57) ABSTRACT

Various embodiments relate to accelerating ramp-down of a modulated signal. In one embodiment, an antenna driver signal is defined and asserted to accelerate ramp-down. The accelerating ramp-down driver signal may include a series of sinusoidal-like pulses asserted at a driver output. The sinusoidal-like pulse may be synchronized by phase to a declining antenna current. Signal properties—such as phase, amplitude, delay, shape and frequency—of the sinusoidal-like pulse may be adopted to affect the ramp-down of the modulated signal.

29 Claims, 12 Drawing Sheets

ACCELERATING ANTENNA RAMP-DOWN AND RELATED SYSTEMS

CROSS-REFERENCE TO RELATED APPLICATION

This application claims the benefit under 35 U.S.C. § 119(e) of U.S. Provisional Patent Application Ser. No. 62/598,917, filed Dec. 14, 2017, the entire contents and disclosure of which is hereby incorporated herein by this reference.

TECHNICAL FIELD

The embodiments of the present disclosure relate generally to low frequency wireless communication, and more specifically, to techniques for accelerating ramp-down of a binary pulse length modulated (BPLM) signal, and antenna drivers and systems that incorporate the same.

BACKGROUND

Conventional car entry systems include a remote key entry (RKE), immobilizer, and passive entry/passive start (PEPS). Some car entry systems incorporate one or more of RKE, immobilizers, and PEPS, such as the system illustrated in FIG. 1.

RKE is a coded message radiofrequency (RF) from a transmitter in a fob to a car to unlock the car doors. Typically the message is encrypted.

In a typical PEPS system, a driver may touch a car door and the vehicle will unlock (passive entry). A driver may press a start button on a dashboard to start the car (passive start). Both these actions begin an authorization processes with a fob on or very near the driver's person. A low-frequency (LF) signal from the car (typically from a PEPS transmitter) awakens the fob. The fob measures the field strength vectors of the LF signal and sends authorization data back to the vehicle. Since the fob orientation is arbitrary, it measures the field vectors in the X, Y, and Z axis. This provides three-dimensional (3D) data, which may localize the fob as either inside or outside the car. If the PEPS system determines that the fob is outside the car, it unlocks the door. If the system determines that the fob is inside the car, it starts the engine.

In a typical immobilizer system, an electronic security device is fitted to an automobile that prevents the engine from running unless the correct key (or other token) is present. The immobilizer may include an electronic device that separates the fuel system, ignition system, and engine. Alternatively, the immobilizer may include an electronic device that is connected to or otherwise interfaces with an engine management sub-system of a car control system. In some systems, a reader (sometimes called an interrogator) in a car transmits an LF interrogation signal that supplies energy through magnetic induction to a storage capacitor in a fob, and the fob initializes for LF downlink. The fob begins an authorization process with the reader, and if the authorization process is successful the immobilizer does not inhibit the engine from running.

In some cases, the same transmitter may be used for the PEPS and the immobilizer function, as with the conventional system illustrated in FIG. 1.

Both a PEPS system and immobilizer system often use one or more antennas in a car to transmit a BPLM signal to a fob. As shown in FIG. 2, BPLM involves, generally, inserting into a carrier field one or more carrier field gaps of fixed duration and setting the gap timing intervals to predetermined times for logic "0" and logic "1." One advantage of this method is that it embeds energy transfer from vehicle to key fob into the data encoding and ensures the key fob will be supplied enough energy to process the encoded data.

Failure to detect a gap may result in an incorrectly demodulated BPLM signal. Other deficiencies and drawbacks of conventional systems may exist.

BRIEF SUMMARY

Embodiments of the present disclosure may relate to an accelerating ramp-down method. The method may include asserting, at a driver output coupled to an antenna, a first signal pulse with first defined signal properties, wherein the first defined signal properties include one or more of amplitude, phase, frequency, prior delay time, and pulse shape; observing phase information of an antenna signal, wherein the antenna signal is observed from an antenna current or an antenna voltage; asserting, at the driver output coupled to the antenna, successive signal pulses having different defined signal properties, wherein at least some of the different defined signal properties are based on the phase information of the antenna signal; detecting a stop condition based on the antenna signal; and asserting, at the driver output coupled to the antenna, a stop signal responsive to the stop condition.

Other embodiments of the present disclosure may relate to an integrated circuit. The integrated circuit may include a configurable state machine and an antenna driver. The configurable state machine may be configured to control the antenna driver to assert a first signal pulse with first defined signal properties. In one embodiment, the first defined signal properties include one or more of amplitude, phase, frequency, prior delay time, and pulse shape. The configurable state machine may be further configured to assert successive signal pulses having different defined signal properties. In one embodiment, at least some of the different defined signal properties are based on phase information of an antenna signal; and assert a stop signal responsive to a stop condition. The configurable state machine may be configured to observe phase information of the antenna signal, wherein the antenna signal is observed from an antenna current or an antenna voltage; and detect the stop condition responsive to the antenna signal.

Other embodiments of the present disclosure may relate to a system. The system may include a low frequency antenna and a radiofrequency device. The radiofrequency device may be operably coupled to the antenna and configured to control the low frequency antenna to emit a modulated carrier wave that during at least one operational mode exhibits a shorter ramp-down period than a resonant ramp-down of the low frequency antenna.

BRIEF DESCRIPTION OF THE DRAWINGS

The purpose and advantages of the embodiments of the disclosure will be apparent to one of ordinary skill in the art from the summary in conjunction with the accompanying drawings. The patent or application file contains at least one drawing executed in color. Copies of this patent or patent application publication with color drawing(s) will be provided by the Office upon request and payment of the necessary fee.

DETAILED DESCRIPTION

Figure 1:
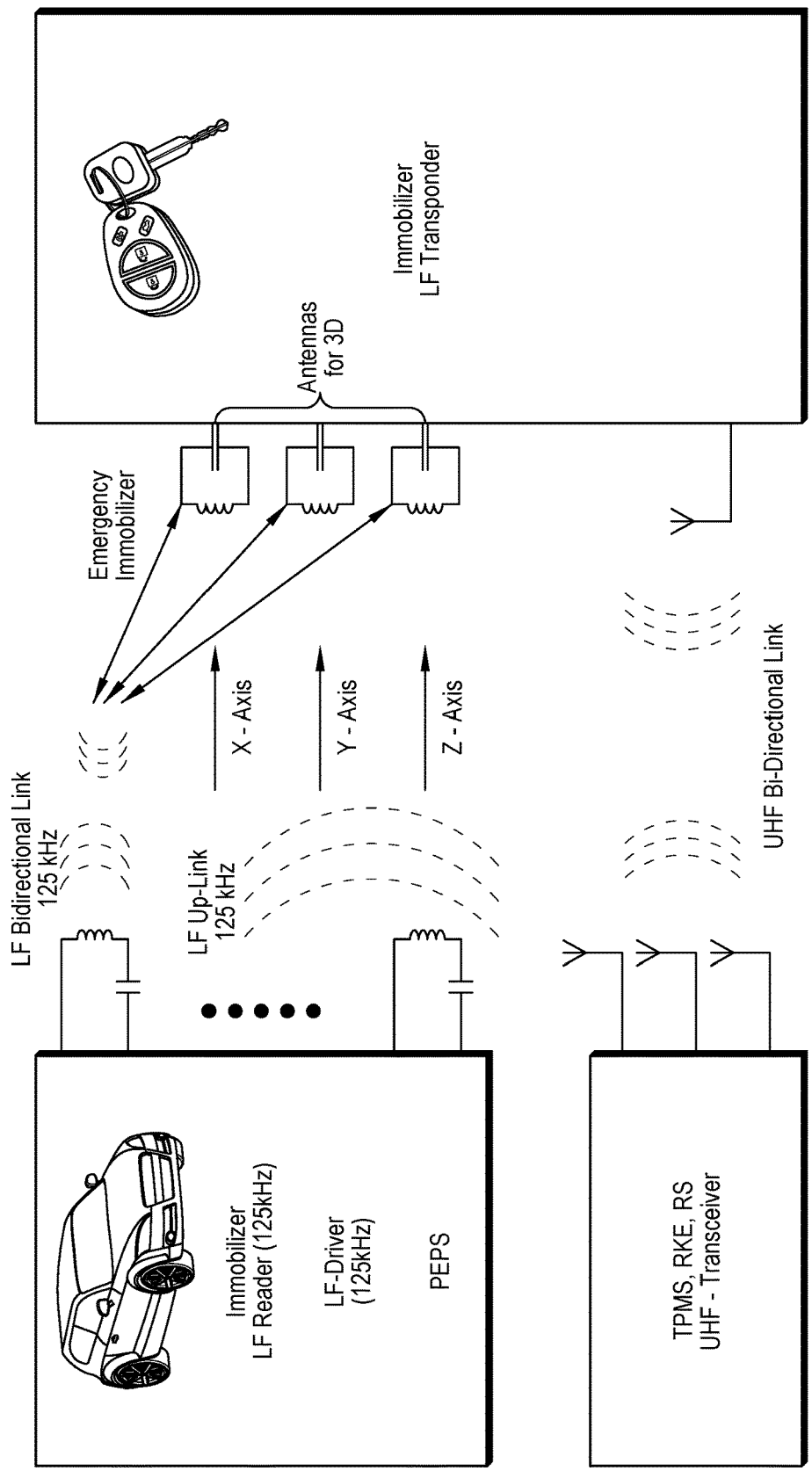
FIG. 1 shows a car entry system incorporating one or more remote key entry, immobilizer, and passive entry/passive start sub-systems according to the state of the art.
Figure 2:
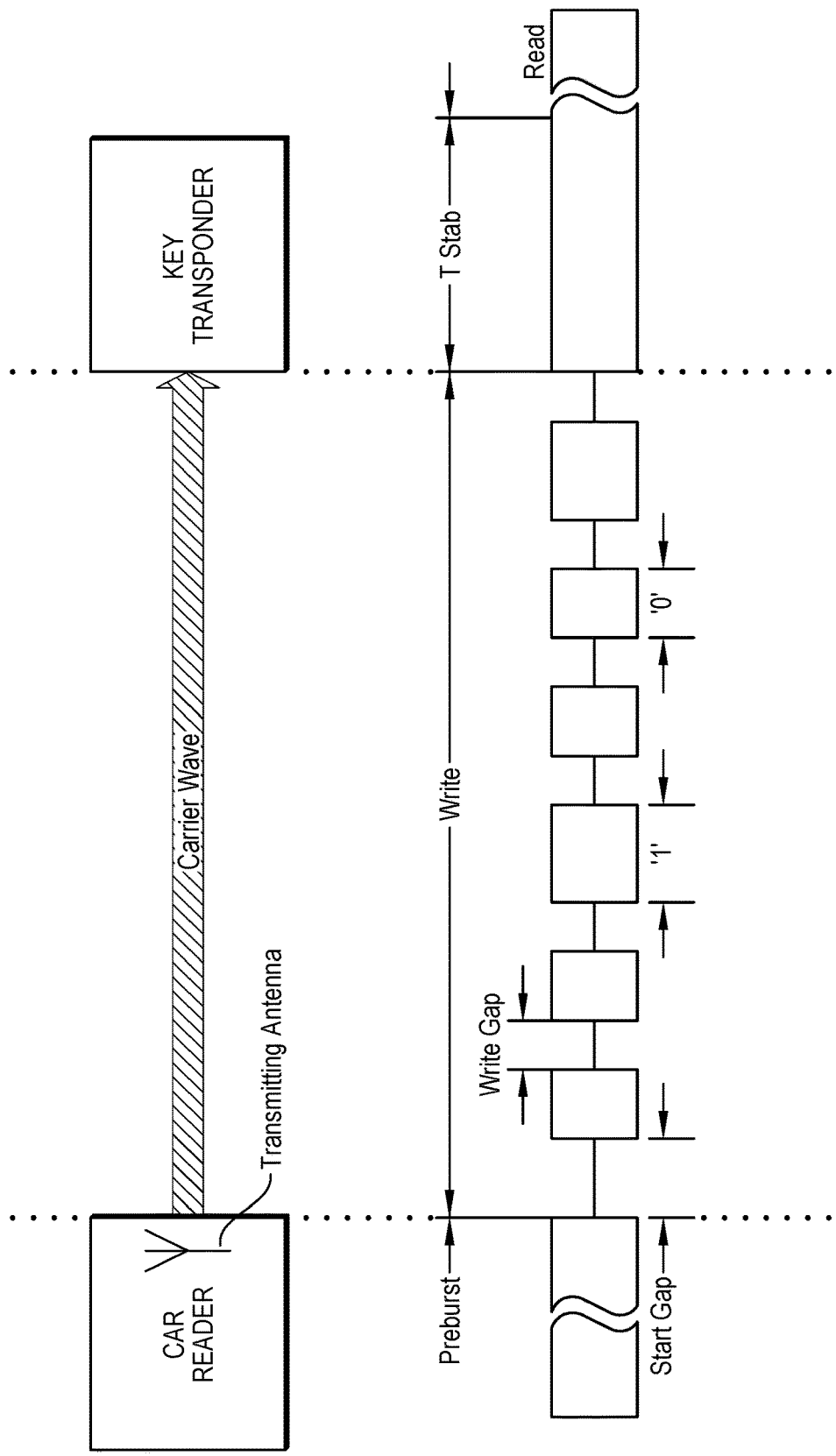
FIG. 2 shows a BPLM signal according to the state of the art.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. An IC may include a configurable state machine with digital logic. By way of example, the configurable state machine may be a combinational logic circuit coupled to one or more memory registers that are configurable. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure. The use of the term "processor" herein is intended to be in the general sense and encompass all of the architectural examples in this paragraph.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein the term "car" is used to mean a vehicle with a motor (e.g., combustion, electric, etc.), generally, driver or driverless, and unless otherwise indicated the term includes a car, a motorcycle, a bus, truck, a sports utility vehicle, a tractor unit (with or without a trailer), and a boat.

As used herein, the term "low frequency" means, unless otherwise provided, a frequency range of about 100 kHz to about 150 kHz.

Figure 3:
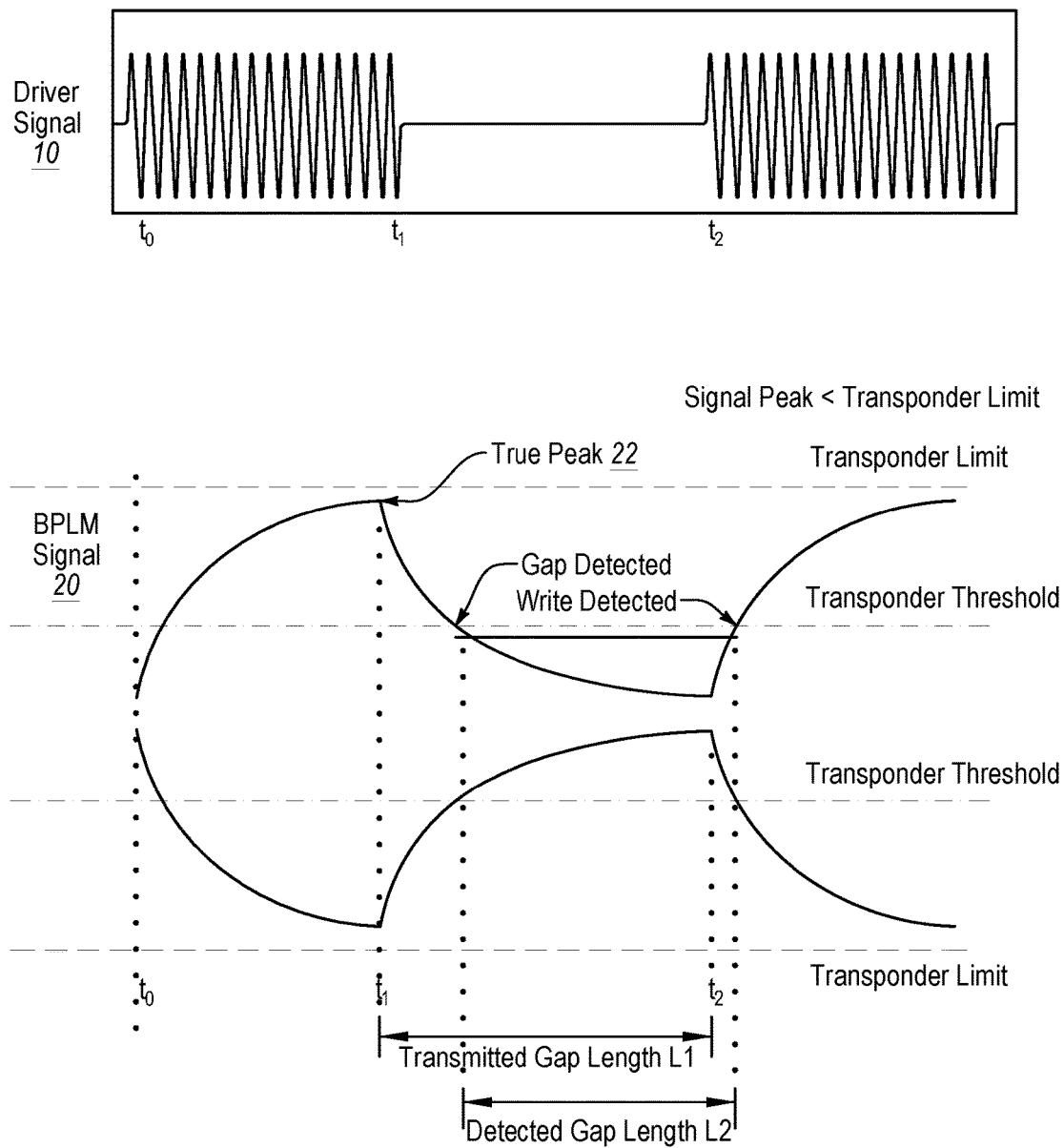
FIG. 3 shows a driver signal as well as a BPLM signal as the BPLM signal may be measured at an antenna driven by the driver signal as well as at a transponder.

Several factors are now understood to contribute to incorrectly or failed demodulated BPLM signals. FIG. 3 shows a driver signal 10 and a transponder voltage 20 (which may also be characterized as a BPLM signal 20). One of ordinary skill in the art would understand that the magnetic field of the carrier signal generated by the transmitting antenna responsive to the driver signal is proportional to the antenna current of the transmitting antenna. The magnetic field of the carrier signal may induce a voltage at the transponder that is proportional to the strength of the magnetic field and therefore also proportional to the transmitting antenna current. Each of an antenna current, magnetic field of the carrier signal, and transponder voltage maybe understood to be a different form of the same BPLM signal. Thus, in connection with the various embodiments described herein, a BPLM signal may be described in terms of the current at the driven antenna, in terms of the magnetic field of the carrier signal transmitted by antenna, and in terms of the voltage induced at the transponder by the magnetic field of the carrier signal.

Further, in various embodiments, on the transmission side of a signal transmitted from a transmitting antenna to a transponder, the antenna current or antenna voltage is measured and the measurement is indicative of a BPLM signal. Thus, current values and current thresholds are described herein, however, one of ordinary skill in the art will understand that the current is indicative of the strength of the carrier signal transmitted by the transmitting antenna, which, in turn, is indicative of the strength of the voltage induced at the transponder.

The driver signal 10 includes one or more signal pulses (e.g., a single sinus cycle) from a driver unit that drives the antenna. In one embodiment, the driver signal 10 may be asserted at one or more outputs of an analog antenna driver (e.g., a Hi-Fi amplifier or an antenna driver that operates similar to a Hi-Fi amplifier). FIG. 3 shows that the BPLM signal 20 ramps up from $t_0$ to $t_1$ and then ramps down from $t_1$ to $t_2$. The time from $t_1$ to $t_2$ is the transmitted gap length $L_1$. At $t_2$ the BPLM signal 20 begins to ramp up. A true peak value 22 of the transponder voltage induced by the carrier signal that is the BPLM signal 20 is less than the transponder limit because, in this example, the magnetic field is not strong enough to induce a voltage that exceeds the transponder limit—for example, due to the physical distance between the transmitting antenna and the transponder.

In one embodiment, a true peak value 22 of the transponder voltage induced by the magnetic field may be observed at the transponder. A transponder threshold may be determined based on the true peak value 22, and in one embodiment a transponder threshold is determined by taking percentage of the observed true peak value (e.g., 50% of the actual peak value). In other embodiments, the transponder value may be determined using a different formula, for example, 30% of the observed peak value of the transponder voltage.

All or part of a transmitted gap may be detected at the transponder when the BPLM signal 20 (here the transponder voltage) crosses the transponder threshold during a ramp-down. A write may be detected when the BPLM signal 20 crosses the transponder threshold during a ramp-up. The time from when the gap is detected to when a write is detected is the detected gap length $L_2$.

An asserted driver signal 10 is shown above the BPLM signal 20 in FIG. 3. The driver signal 10 may be configured to drive a transmitting antenna that transmits the carrier signal that is a BPLM signal 20. The amount of the step-up and step-down of an antenna current of the transmitting antenna may increase/decrease responsive to the amplitude of the driver signal 10. In FIG. 3, the driver signal 10 is a sinusoidal waveform during the ramp up period and then a 0 amplitude signal is asserted at $t_1$ to "allow" the ramp-down of the BPLM signal. In other embodiments the driver signal 10 may take another shape including, without limitation, a rectangular shape or a Gaussian shape.

Figure 4:
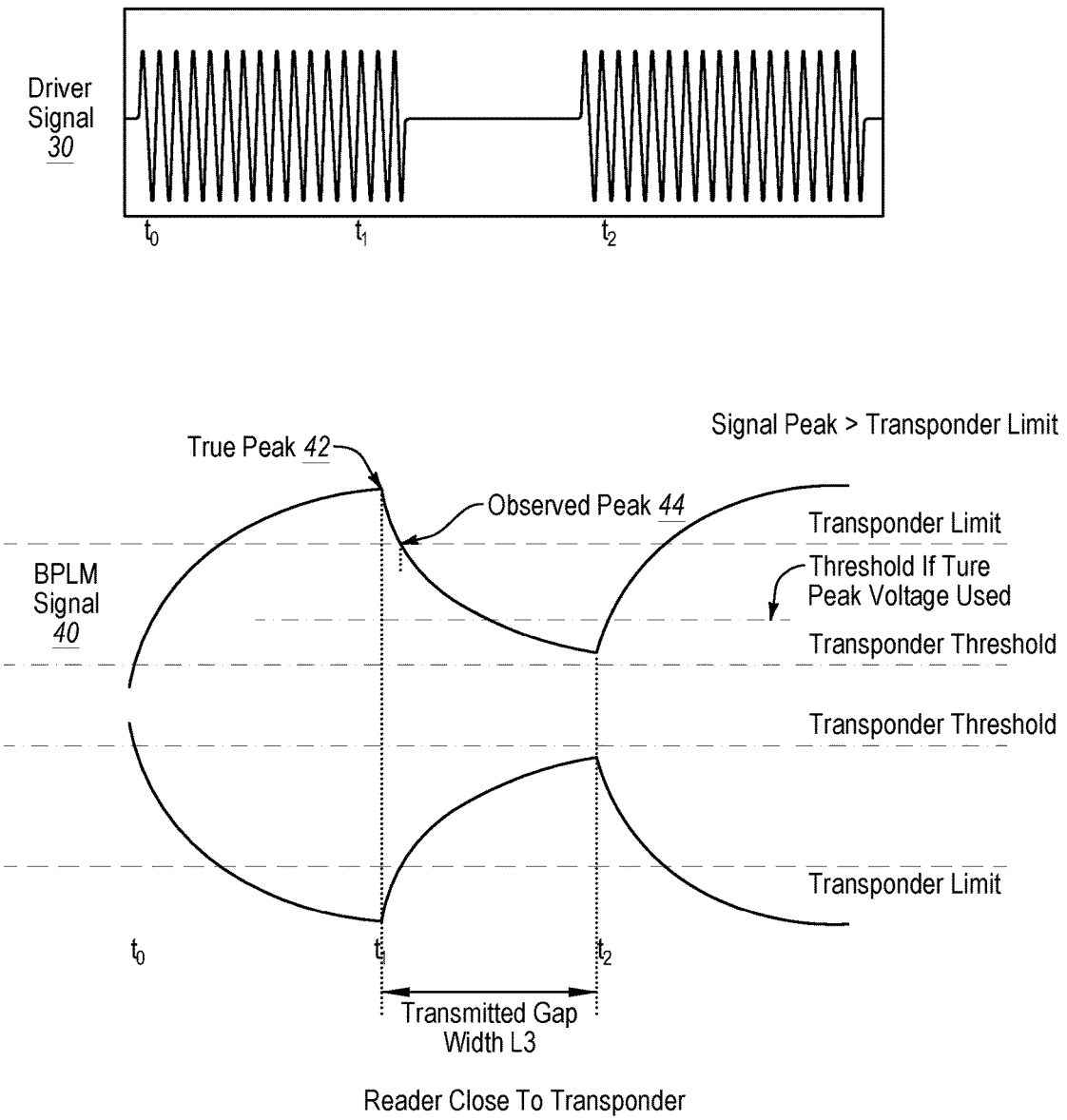
FIG. 4 shows a BPLM signal where the antenna transmitting the BPLM signal and transponder are close and the peak voltage of the BPLM signal is greater than the transponder limit.

FIG. 4 shows a transponder voltage that would be higher than the transponder's voltage limit (i.e., the transponder limit) due to a higher magnetic field strength. As noted above, the transponder threshold may be determined as a percentage (e.g., 50%) of the peak voltage 44 observed at the transponder. Here, a peak voltage is limited by the transponder's voltage limit, so the observed peak voltage 44 is actually the transponder's voltage limit, not the true peak voltage 42 that would have otherwise been induced. Thus, the transponder threshold is, e.g., 50% of the transponder's voltage limit. If the true peak voltage 42 had been used to determine the transponder threshold then the transponder threshold would have been higher, as shown in FIG. 4. As a result, the transponder voltage does not reach the threshold during ramp-down by $t_2$, and so the transmitted gap is not detected at all.

It is now understood that the strength of the magnetic field of the carrier wave when it reaches a transponder varies depending on the distance from a transmitting antenna to the transponder. A stronger magnetic field may induce, as shown in FIG. 4, a transponder voltage having a true peak voltage 42 higher than the voltage limitation of the transponder. Thus, the peak voltage is limited and, hence, the transponder threshold is derived from an observed peak voltage 44 (which is equivalent to the transponder limit) that is lower than the true peak voltage 42 and the transponder voltage does not reach the transponder threshold before ramp-up begins.

For applications where a transponder is close to a transmitting antenna (in the example of a PEPS or immobilizers, it may be a few centimeters) there is a high likelihood that a BPLM signal will be incorrectly demodulated. If the signal is incorrectly demodulated, then in the PEPS or immobilizer example, an authentication process may take longer or fail. For an immobilizer, if the authentication fails then a car's engine may not start.

The challenge of detecting the transmitted gap may be further exacerbated if the protocol for the transmission and reception of the BPLM signal uses short gaps (e.g., an immobilizer protocol may use a shorter gap width than a passive entry protocol).

In various embodiments of the present disclosure, an acceleration of the ramp-down period is defined. The "acceleration" is in comparison to a resonant antenna ramp-down without driver signal stimulation.

Generally, in various embodiments a driver signal is defined and asserted to accelerate ramp-down (referred to herein as an "accelerating ramp-down driver signal"). The accelerating ramp-down driver signal may include a series of sinusoidal-like pulses asserted at a driver output. Each sinusoidal-like pulse may be synchronized to the phase of a declining antenna current. The signal properties—such as phase, amplitude, delay, shape and frequency—of each sinusoidal-like pulse may be adopted to affect the ramp-down of the antenna current and therefore the carrier wave. The resulting 180° phase difference between driver voltage and antenna current results in a faster ramp-down of the BPLM signal by the antenna, with a larger effect if the signals are about 180° out of phase versus only about 90° out of phase. In some embodiments, the accelerating ramp-down driver signal may be sinusoidal-like pulses, and may be a waveform having a similar effect as a sinusoidal pulse but with a zero slope start and a zero slope end to minimize EMI emissions as the repetition rate of the pulses adapts to the resonant frequency of the antenna.

Figure 5:
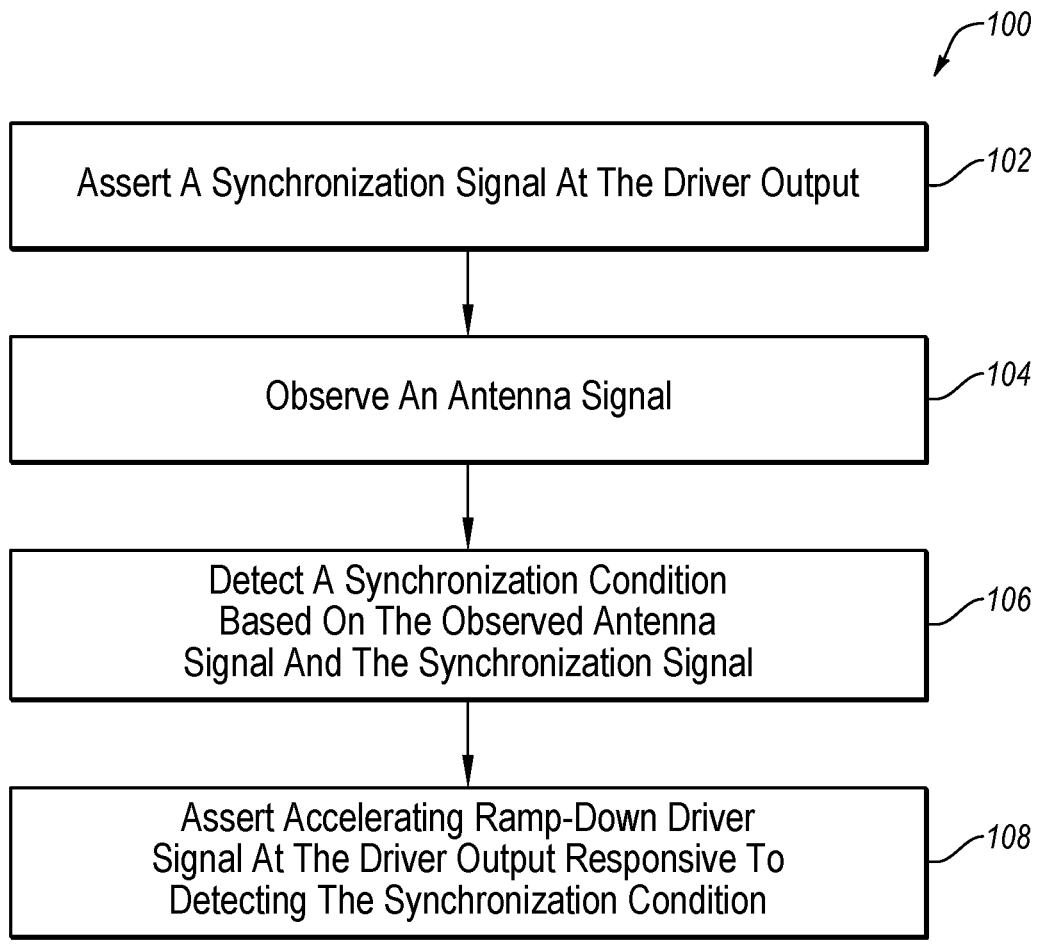
FIG. 5 shows a synchronization process in accordance with an embodiment of the disclosure.
Figure 6:
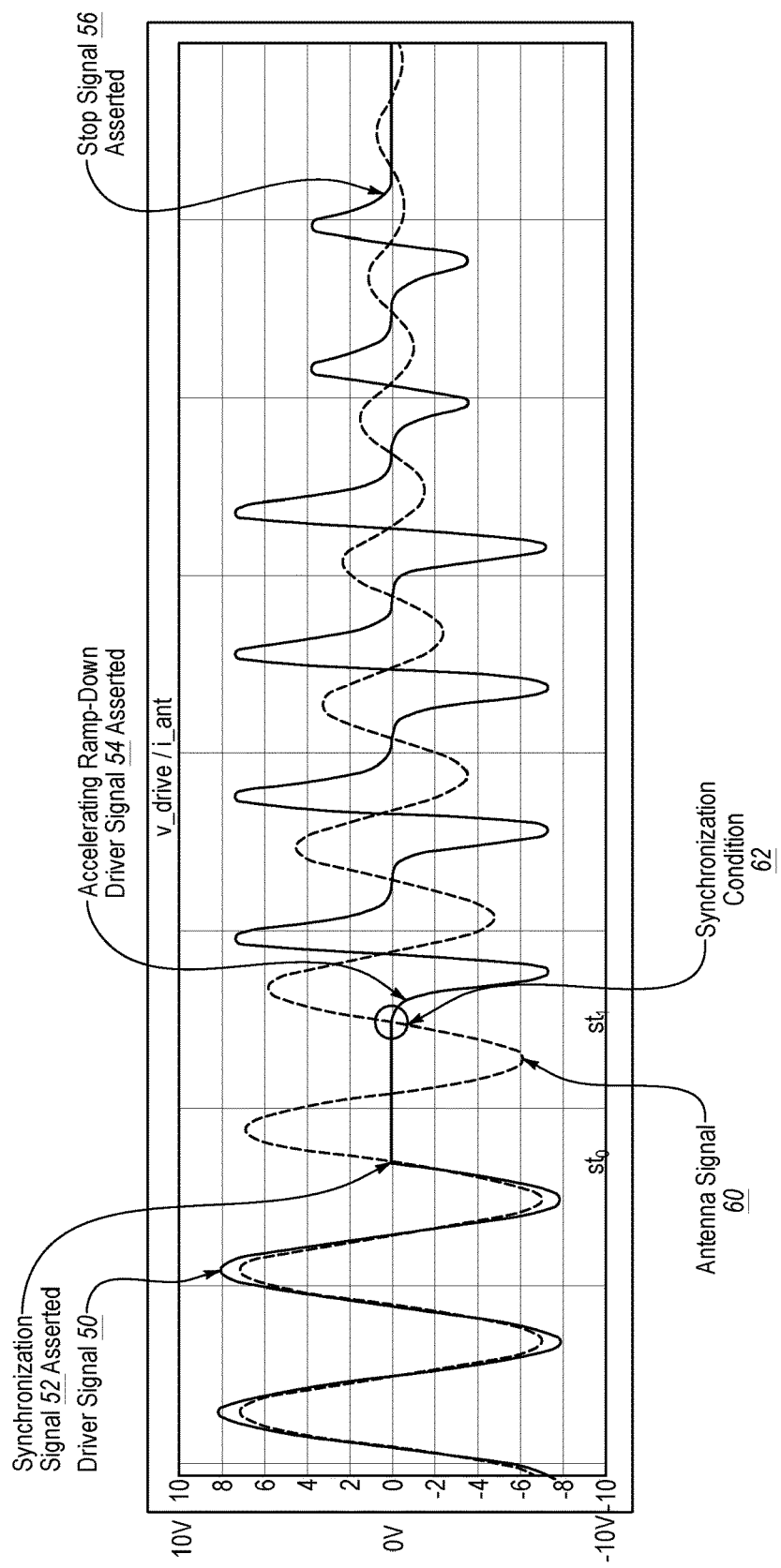
FIG. 6 shows an asserted driver signal and an antenna signal during an embodiment of the synchronization process.

FIGS. 5 and 6 relate to an embodiment of a synchronization process 100. A synchronization signal is asserted at the driver output in operation 102. In one embodiment, the synchronization signal may be a 0 volt signal (or equivalent signal between a min and max) asserted at the driver output. The antenna signal is observed in operation 104. By way of example, the antenna signal level may be observed from the antenna current or antenna voltage. A synchronization condition is detected based on the observed antenna signal and a synchronization signal in operation 106. In one embodiment, the synchronization condition is a zero-cross. In one embodiment a zero-cross may be detected using a zero-cross detector circuit. A zero-cross detector may be configured to compare an antenna current to a threshold reference (e.g., the synchronization signal). An accelerating ramp-down driver signal is asserted at the driver output responsive to detecting the synchronization condition, in operation 108.

FIG. 6 shows an asserted driver signal 50 and an antenna signal 60 during an embodiment of a synchronization process 100. The synchronization signal 52 is asserted at the driver output at $st_0$ (synchronization time 0). An antenna signal 60 crosses synchronization signal 52 at $st_1$ and subsequent to that synchronization crossing condition 62 an accelerating ramp-down driver signal 54 is asserted.

In one embodiment, the synchronization signal 52 may be in the form of a delay in asserting the accelerating ramp-down driver signal 54. FIG. 6 shows the delay time occurs from the end of the previous signal pulse till the synchronization crossing condition 62 is detected. The previous signal pulse may be a sinus cycle or a sinus-like ramp-down pulse. In another embodiment, the delay time may occur from the peak of the previous signal pulse till the synchronization crossing condition 62 is detected.

Notably, during ramp-up, a transmitting antenna oscillates at a frequency of a carrier signal transmitted from an external antenna and so also oscillates at a frequency of a driver signal. During ramp-down, a frequency of a transmitting antenna transitions to an antenna's self-resonant frequency. If the self-resonant frequency differs from a frequency of a driver signal then there will be a phase difference between driver signal and antenna current. The synchronization process 100 of FIG. 5, may account for this phase difference, and synchronizes the two signals. In some cases, synchronization signals may be asserted for longer or shorter periods of time due to the differences between a self-resonant frequency of an antenna and a frequency of a driver.

A stop signal may be asserted at the driver output at the end of the accelerating ramp-down period (e.g., 0 volts).

Figure 7:
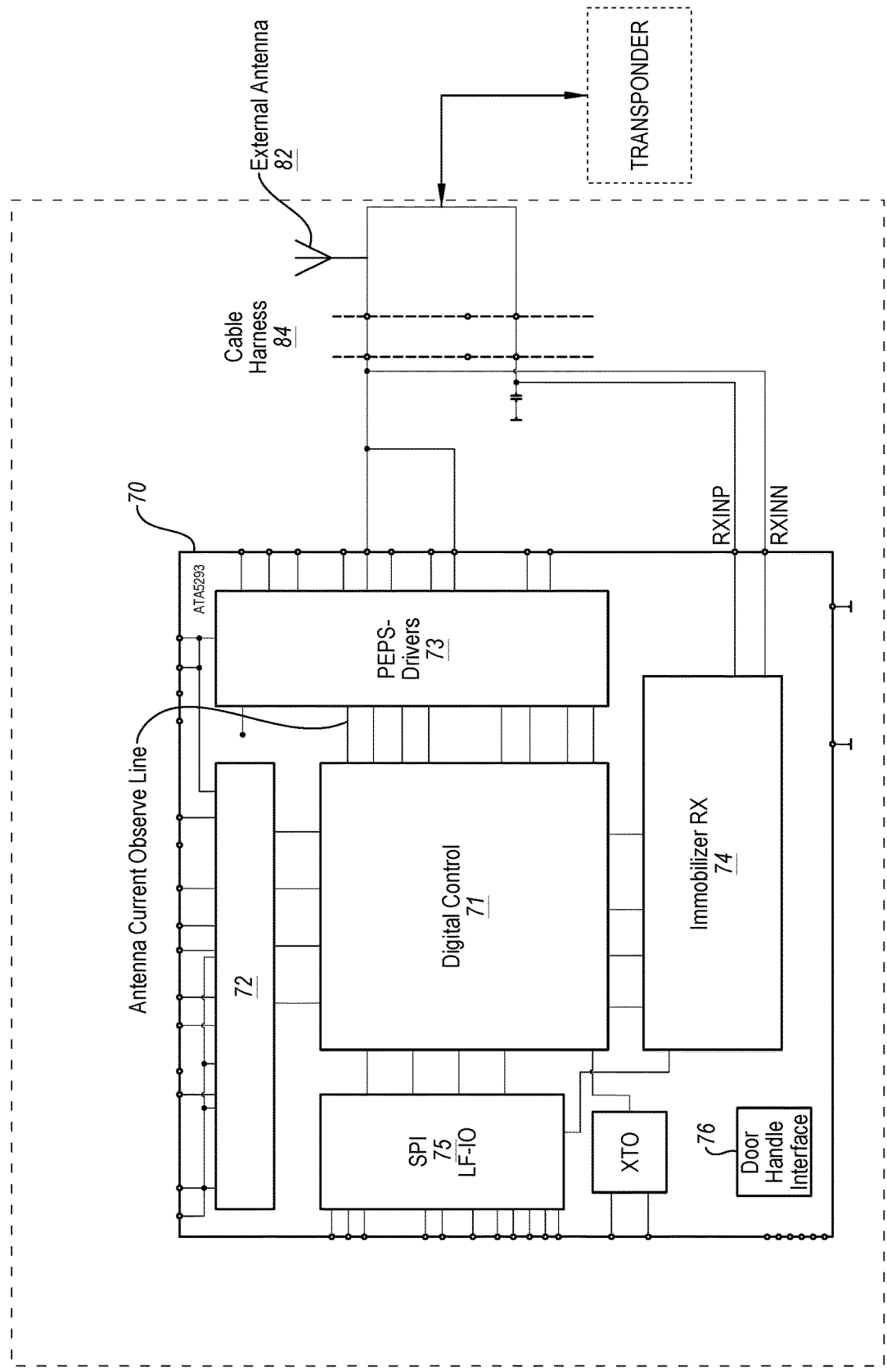
FIG. 7 shows an antenna control system in accordance with an embodiment of the disclosure.

FIG. 7 shows an antenna control system that includes an integrated circuit (IC) package 70 that includes a digital control 71 (in this embodiment, a configurable state machine), power supply 72, antenna driver (PEPS-driver) 73, reader (immobilizer Rx) 74, serial peripheral interface 75, and door handle interface 76. The IC package 70 may be configured to operably couple to, and provide control signals to, an external antenna 82. The embodiments of the IC package 70 may be used in embedded applications and incorporated into embedded devices. For example, the IC package 70, external antenna 82, and an engine control device (e.g., lock cylinder, fuel injection control device, a switch in the case of an electric motor) may comprise an immobilizer sub-system within a car. The IC package 70, external antenna 82 and a door access control system (e.g., an automatic door lock controller) may comprise a passive entry sub-system within a car. The antenna control system may be for a car entry system. A car may include multiple sub-systems that incorporate an IC package 70, e.g., an IC package 70 may enable both an immobilizer sub-systems, a remote keyless entry sub-system, and a PEPS sub-system. Further, a car subsystem may incorporate multiple IC packages 70.

The digital control 71 may be configured to control the driver 73 for both PEPS and immobilizer applications, although other applications may be included in addition to or alternative to the PEPS and immobilizer applications. The external antenna 82 may be coupled to one or more outputs of the driver 73 by a cable harness 84 or other wiring assembly. In one embodiment, the external antenna 82 is a resonant circuit (resistor, capacitor, and an inductor) tuned to operate at an LF (e.g., 125 kHz). The external antenna 82 is a shared antenna, meaning, it is used for both PEPS and immobilizer protocols. In other embodiments, separate antennas may be used for different protocols.

The external antenna 82 may be incorporated onto a printed circuit board (PCB) with the IC package 70 or it may be remote from the IC package 70. In one embodiment, the number of driver outputs asserting a driver signal to the external antenna 82 may vary responsive to the control logic of the digital control 71. For example, for an eight (8) output driver, all eight outputs may be asserted and generate a stronger signal than if fewer outputs are asserted. The digital control 71 (e.g., configurable state machine) may be configured to control the driver 73 to assert a driver signal at a number of driver outputs, the number being defined by the particular protocol that the digital control 71 executes.

Figure 8:
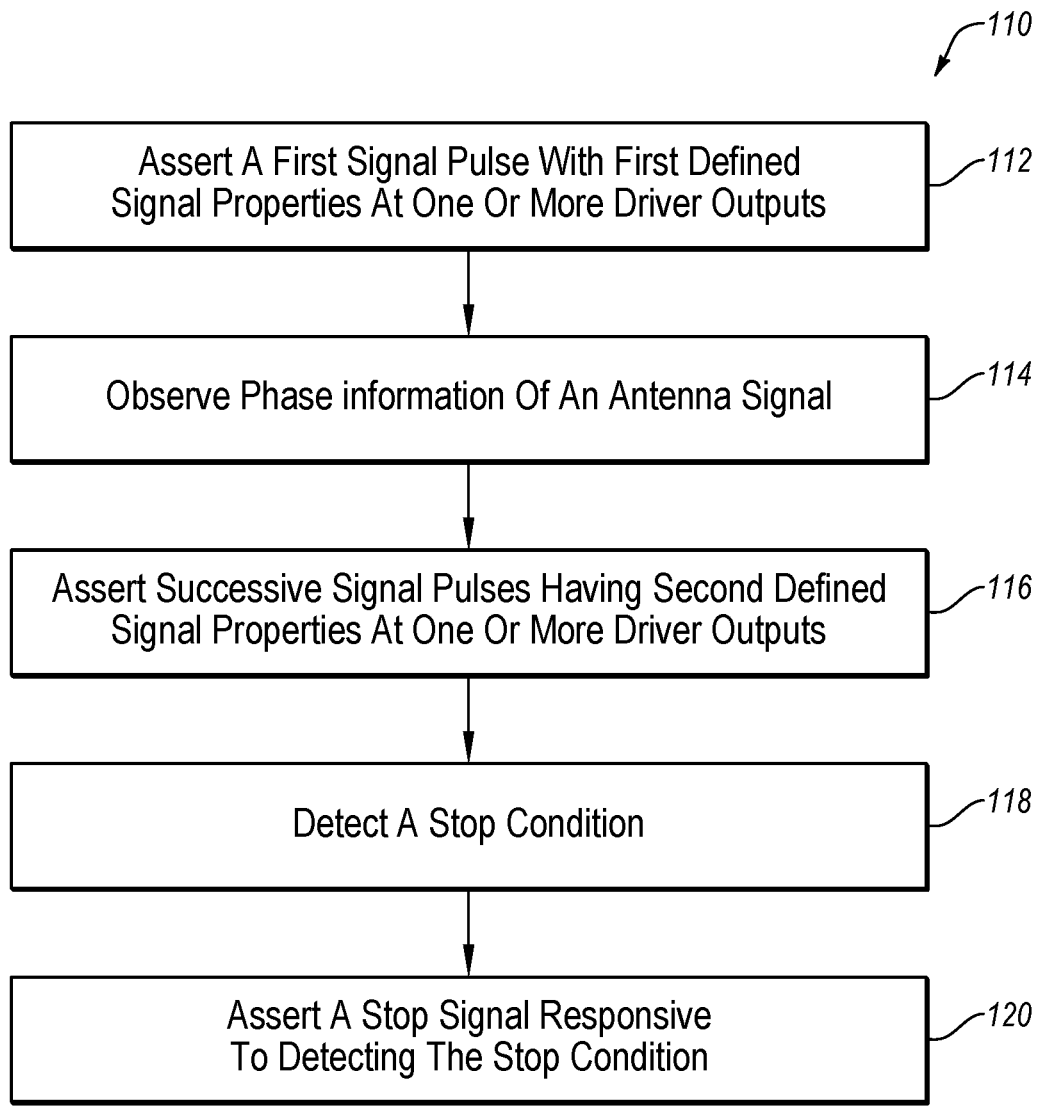
FIG. 8 shows an accelerating ramp-down process in accordance with an embodiment of the disclosure.

In various embodiments, one or more protocols executed by the digital control 71 include an accelerating antenna ramp-down protocol. FIG. 8 shows an accelerating antenna ramp-down process 110, in accordance with an embodiment of the disclosure. A first signal pulse with first defined signal properties is asserted at one or more driver outputs in operation 112. Phase information of an antenna signal is observed in operation 114. Successive signal pulses having different defined signal properties are asserted at one or more driver outputs in operation 116. A stop condition is detected in operation 118. In one embodiment, the driver may include an observer for the antenna current. In one embodiment the stop condition is an antenna signal equal to or below a predetermined threshold (e.g., 0, 1 mA, 10 mA, etc.). A stop signal (e.g., about 0 v) is asserted responsive to detecting the stop condition in operation 118. In one embodiment, if the configurable state machine detects the stop condition then the configurable state machine may control the driver to assert 0 volts (or equivalent). Notably, if the driver output continued to assert the accelerating ramp-down pulse then the antenna signal would begin a ramp-up after reaching 0, and the gap width would not comply with the gap definition for the protocol.

In another embodiment, a stop condition may be detected responsive to a time period of an antenna current. Turning back to FIG. 6, FIG. 6 shows that, when the stop signal 56 is asserted, a time period of the antenna signal is the self-resonance frequency of the antenna (here, between $1/120$ kHz and $1/130$ kHz) if an antenna is driven by a 0 volt signal. As the antenna current gets low (i.e., low energy in the antenna) the phase detection (zero-cross) may be less accurate, so stimulating ramp-down pulses may not be applied according to an optimal timing. An antenna signal is a superposition of a declining energy and an energy supplied by the out of phase pulses. As a result, an antenna signal is no longer sinusoidal, and the measured time period of the antenna signal might differ (even significantly) from the self-resonance frequency of the antenna. Accordingly, the time period of an antenna signal being outside an antenna signal range may be indicative of a stop condition. For example, if a time period is higher than a predefined threshold (e.g. >$1/115$ kHz) then a stop condition may be detected, or if a time period is smaller than a predefined threshold (e.g. <$1/135$ kHz) then a stop condition may be detected.

Figure 9:
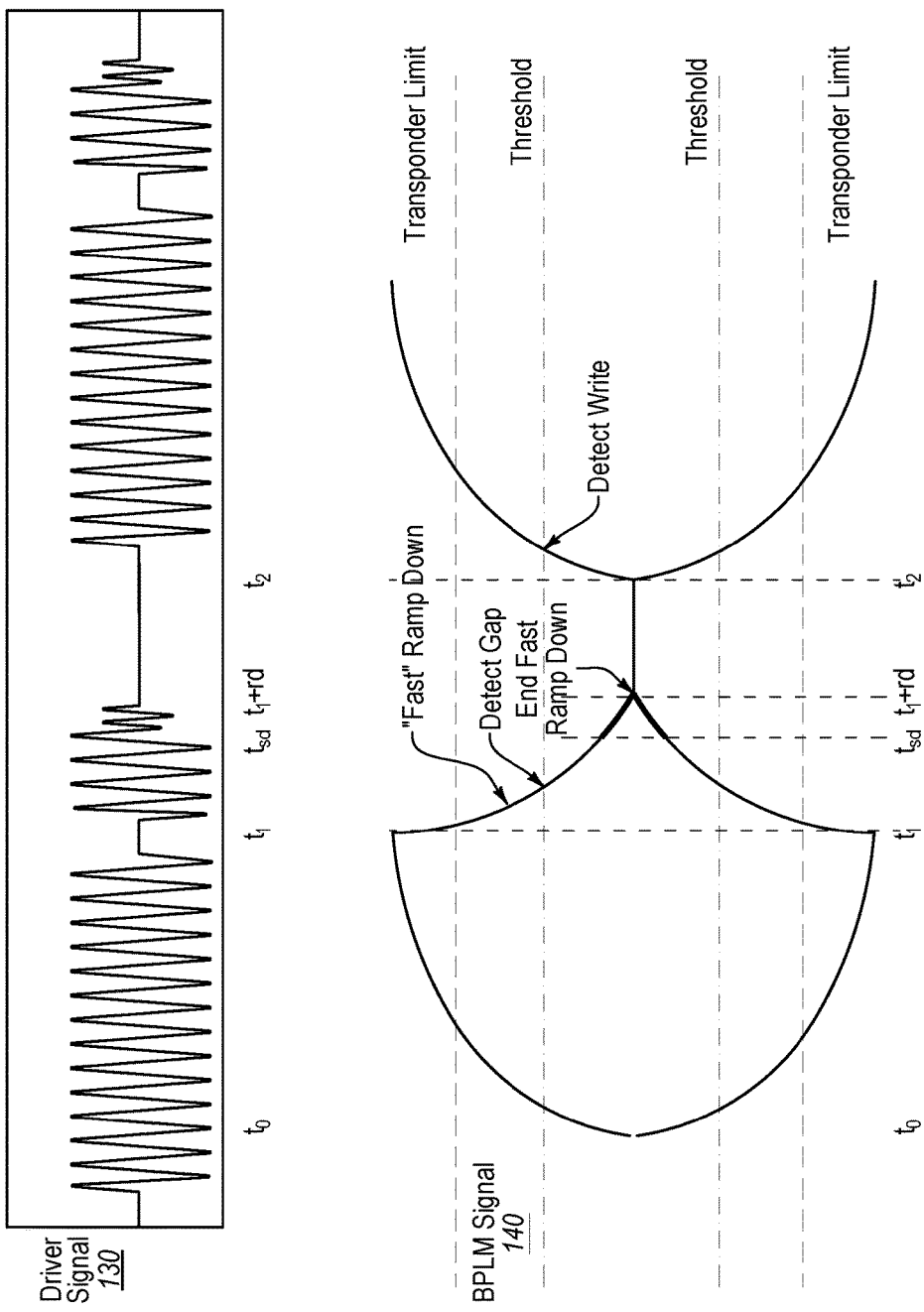
FIG. 9 shows a driver signal as well as a BPLM signal transmitted by an antenna driven by the driver signal during an accelerating ramp-down process in accordance with an embodiment of the disclosure.

FIG. 9 shows a driver signal 130 as well as a BPLM signal 140 as it may be measured at a transponder (or an antenna) during an accelerating ramp-down, such as an accelerating antenna ramp-down process 110 (FIG. 8). At time $t_1$ the accelerating ramp-down signal is asserted at the driver output. In the accelerating ramp-down signal, each signal pulse is out of phase with the antenna signal as shown in FIG. 6. Out of phase signal pulses are repeatedly asserted until $t_{1+rd}$ ($t_1$+the ramp-down period). At about a stop condition is detected, and a stop signal is asserted at the driver output.

In one embodiment, the stop condition may be detected by the digital control 71 responsive to detecting that an antenna signal is at or below a predetermined threshold. Notably, the ramp-down period for the BPLM signal 140 of FIG. 9 is shorter than a ramp-down period of the BPLM signal 40 of FIG. 4, and so the BPLM signal 140 crosses a transponder threshold during ramp-down and a transponder may detect a gap as well as detect a write when the BPLM signal 140 crosses the transponder threshold during the subsequent ramp up. Notably, the transponder threshold is based on the transponder's voltage limit (not the true peak value of the transponder voltage) and is lower than a transponder threshold determined based on the peak transponder voltage. Nevertheless, because of the accelerating ramp-down, the transponder voltage crosses the transponder threshold and a gap may be properly detected in the BPLM signal 140.

The BPLM signal 140 ends the ramp-down period before the beginning of the next ramp up period, and so a 0 volt driver signal may be asserted that holds the antenna signal at 0 until the start of the ramp-up period.

Figure 10:
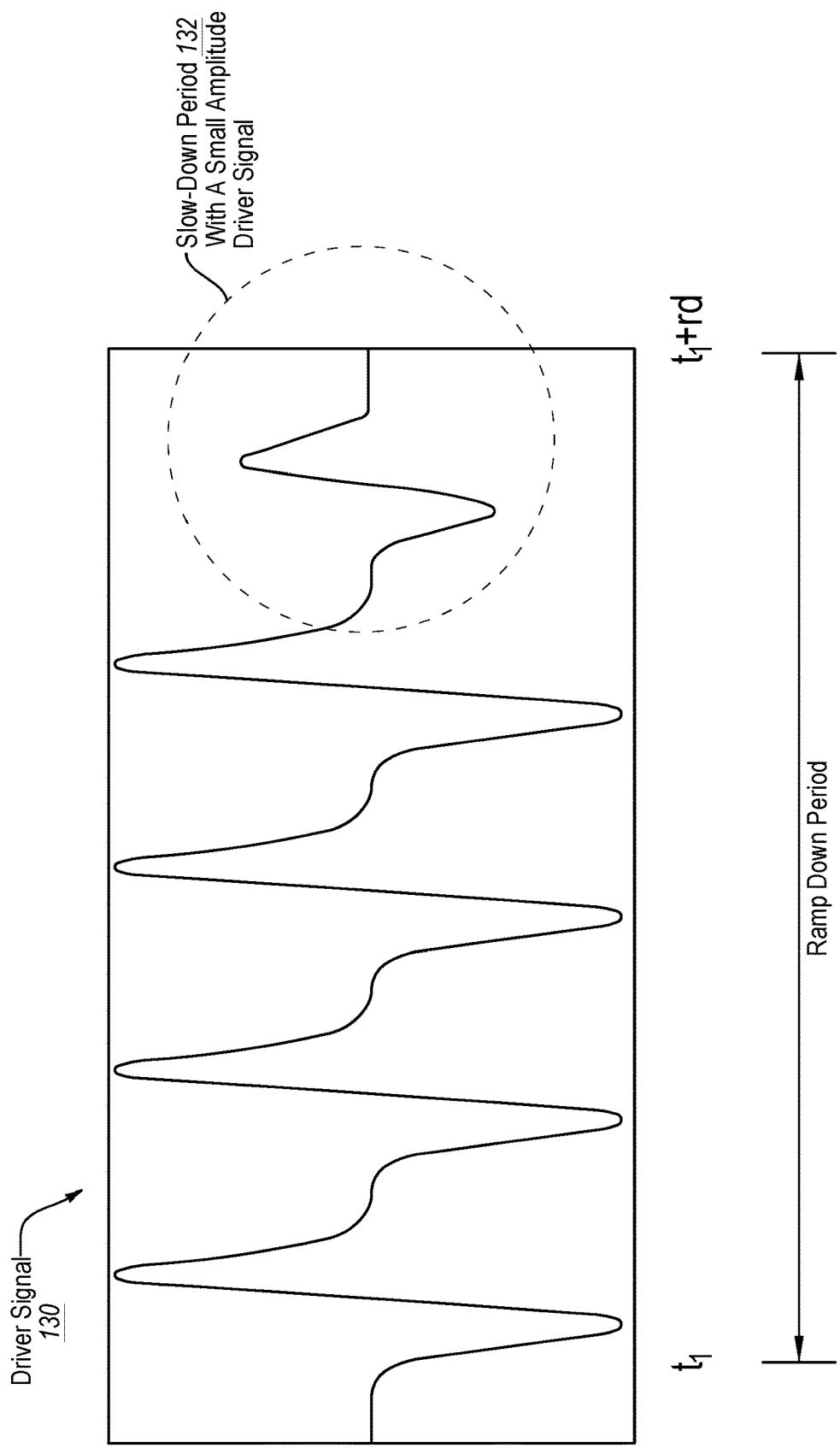
FIG. 10 shows the driver signal of FIG. 9 with larger time granularity to highlight a slow-down period in the ramp-down period, in accordance with an embodiment of the disclosure.

FIG. 10 shows the driver signal 130 of FIG. 9 with larger time granularity. In this embodiment, the driver signal 130 is Gaussian pulsed, which may improve the EMI performance over sinusoidal or rectangular wave-forms. Also in this embodiment, there is a slow-down period 132 where the step down size is reduced. Generally, the amplitude of a driver ramp-down signal is designed to be proportional to an amplitude of the decreasing antenna current. In various embodiments, a ramp-down may be aggressive at the beginning of a ramp-down period and then slower as an antenna current approaches a zero. Reducing the amplitude of the driver signal 130 reduces the size of the step down of the antenna signal, which is shown in FIG. 9 by the BPLM signal 140 having a changing, smaller rate of change at the end of the ramp-down period at $t_{sd}$ (i.e., a time at which the rate of change of the ramp down slows) till $t_{1+rd}$ (BPLM signal 140 is shown with a heavier weight from $t_{sd}$ to $t_{1+rd}$ merely to call attention to that part of the signal), then the BPLM signal 140 is 0. Though only one amplitude change is shown in FIG. 9, multiple amplitude changes may occur.

Figure 11:
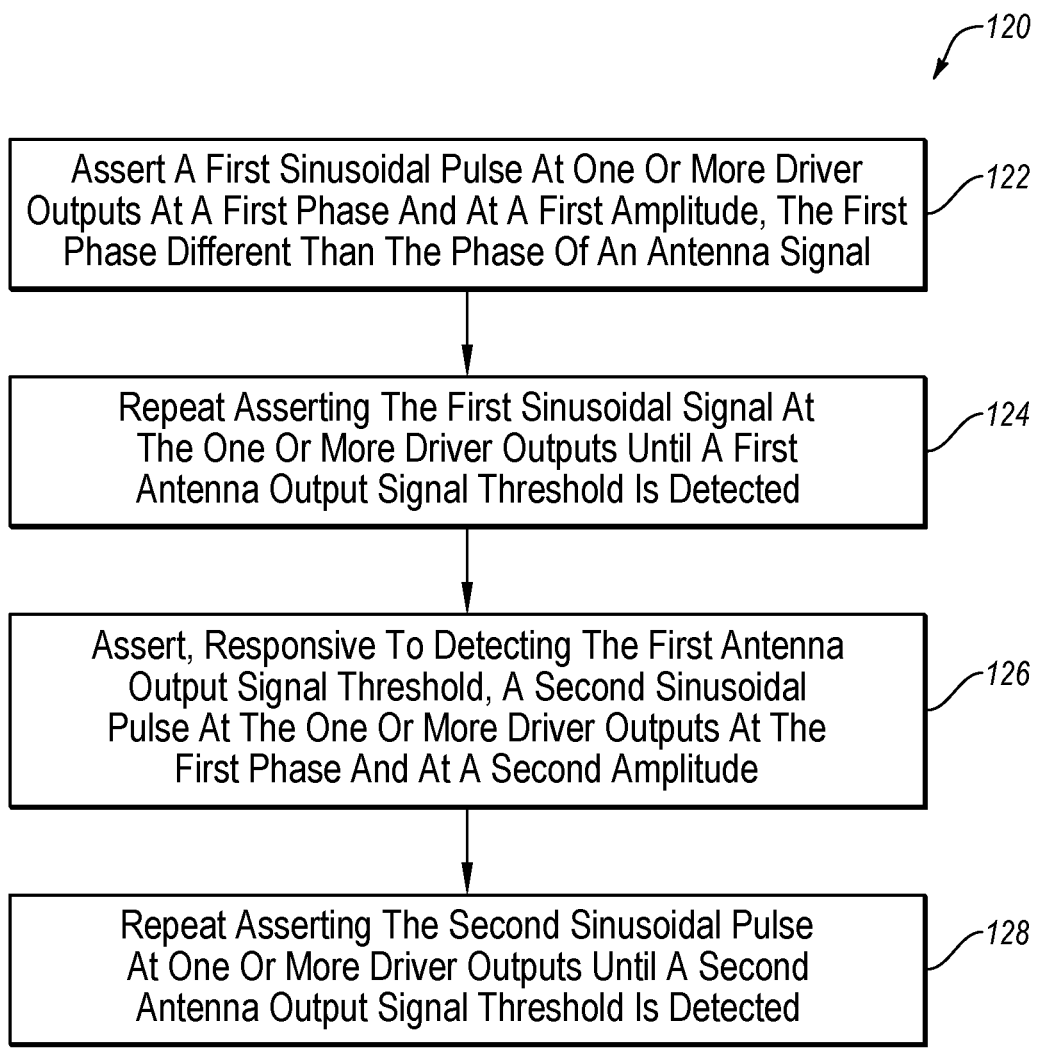
FIG. 11 shows an accelerating antenna ramp-down protocol that includes a changing step down size of an antenna signal at the end of the ramp-down period, in accordance with an embodiment of the disclosure.

FIG. 11 shows an accelerating antenna ramp-down process 120, in accordance with an embodiment of the disclosure. A digital control 71 may execute such an accelerating antenna ramp-down process 120 as part of an accelerating ramp-down protocol, in accordance with an embodiment of the disclosure. The accelerating antenna-ramp down process 120 includes changing a step down size of the antenna signal near the end of the ramp-down period. A first signal pulse is asserted at one or more driver outputs at a first phase and at a first amplitude in operation 122. In one embodiment, the first phase may be different than a phase of an antenna signal of an antenna coupled to the one or more driver outputs. The first sinusoidal signal is repeatedly asserted at the one or more driver outputs until a first antenna output signal threshold is detected in operation 124. In one embodiment, the first antenna output signal threshold may be associated with a slow-down period where the step down size of the antenna signal is reduced. A second sinusoidal pulse is asserted at the one or more driver outputs responsive to detecting the first antenna output signal threshold at the first phase and at a second amplitude, in operation 126. In one embodiment, the second amplitude is smaller than the first amplitude. The second sinusoidal pulse is repeatedly asserted at the one or more driver outputs until a second antenna output signal threshold is detected in operation 128. In one embodiment, the second antenna output signal threshold may be associated with a second slow-down period where the step down size of the antenna signal is further reduced. In another embodiment, the second antenna output signal threshold may be associated with the end of a ramp-down period. A person of ordinary skill in the art will recognize that there may be some jitter in the phases of the asserted signals and the antenna signal.

Figure 12:
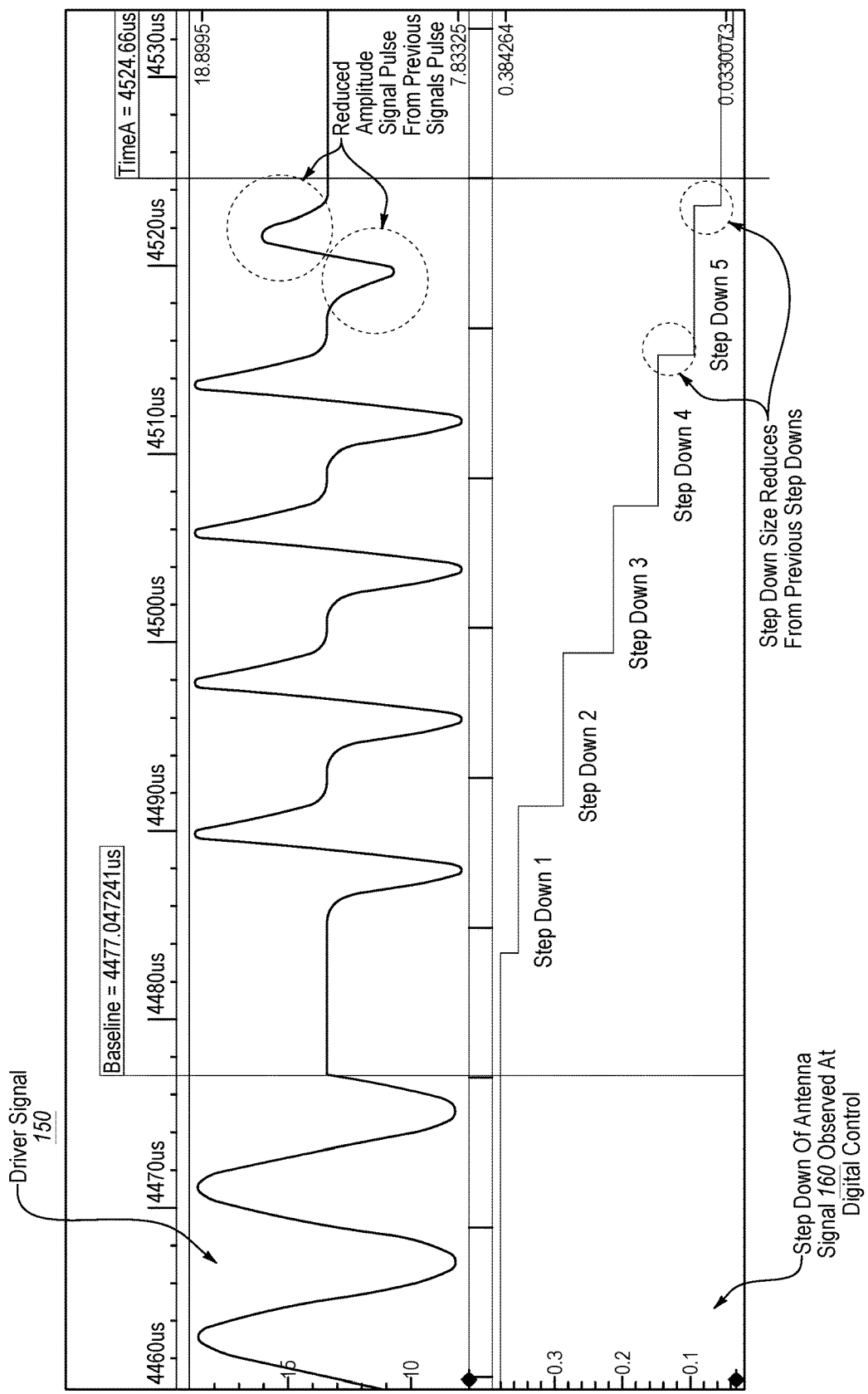
FIG. 12 shows how the rate change of the step down size of the antenna current sampled at the observe line during a slow-down period of a ramp-down period.

FIG. 12 shows the rate change of the step down size of an antenna signal 160 during a slow-down period of a ramp-down period. Here, the antenna signal 160 is shown as a current value sampled at an observer during a slow-down period of a ramp-down period. In other words, a peak search may be performed by a sample-and-hold or sample current 90° after antenna current zero-cross. The step down size is about the same for the first three full step downs, step down 1, 2, 3, and 4. The amplitude of the signal pulses of a driver signal 150 are about the same during those step downs. The subsequent downs of the antenna signal 160, e.g., step down 5, have a smaller step down size than the previous step downs. The reduced step down size is a response to the reduced amplitude driver signal pulses. A person of ordinary skill in the art will recognize that the disclosure is not limited to the step-down amounts shown in FIG. 12, and may include any other combination of step-down amounts, including a constant step-down amount.

In one embodiment, a threshold is not defined in response to which a reduced voltage is applied, instead, a variable voltage is applied in response to a measured antenna signal. In such an embodiment, the amplitudes of ramp-down pulses may be proportional to a measured antenna current (or signal). Such an implementation may be equivalent in terms of the basic functionality of a ramp-down process that uses a threshold, but may be characterized by more precision. So, a ramp-down process may be accelerated even more at the cost of higher implementation effort. In such an embodiment, an antenna current may be measured (e.g., sampled) with high resolution instead of using a coarser switched threshold. A ramp-down pulse amplitude would be produced that is proportional to the measured antenna current. The disclosure specifically contemplates embodiments where a ramp-down pulse is asserted responsive to both thresholds and antenna signal measurements—the embodiments described herein are not exclusive.

While embodiments of the disclosure have been described in terms of BPLM, a person of ordinary skill in the art will recognize that the disclosure is applicable to other modulation schemes, for example, Manchester encoding, differential Manchester encoding, Biphase encoding, binary offset carrier modulation, etc.

Many of the functional units described in this specification may be illustrated, described or labeled as modules, threads, or other segregations of programming code, in order to more particularly emphasize their implementation independence. Functional units may be at least partially implemented in hardware, in one form or another. For example, a functional unit may be implemented as a hardware circuit comprising combinational logic circuits (with memory registers), custom VLSI circuits or gate arrays, off-the-shelf semiconductors such as logic chips, transistors, or other discrete components. A functional unit may also be implemented in programmable hardware devices such as field programmable gate arrays, programmable array logic, programmable logic devices, or the like.

Functional units may also be implemented using software or firmware, stored on a physical storage device (e.g., a computer-readable storage medium), in memory, or a combination thereof for execution by various types of processors. For example, an identified module of executable code may comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some embodiments, the software portions are stored in a non-transitory state such that the software/firmware portions, or representations thereof, persist in the same physical location for a period of time. Additionally, in some embodiments, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are flash memory and random-access-memory (RAM). Another example of a non-transitory storage device includes a read-only memory (ROM), which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

Additional non-limiting embodiments of the disclosure include:

Embodiment 1: An immobilizer sub-system, the immobilizer sub-system comprising a reader configured to interact with a transponder by emitting a low frequency modulated carrier wave that during at least one operational mode exhibits a shorter ramp-down period than a resonant ramp-down of the low frequency antenna, wherein the immobilizer sub-system is configured to inhibit a car motor or engine from operating normally unless an authorized transponder is detected.

Embodiment 2: A passive entry/passive start sub-system, the passive entry/passive start sub-system comprising a reader configured to interact with a transponder by emitting a low frequency modulated carrier wave that during at least one operational mode exhibits a shorter ramp-down period than a resonant ramp-down of the low frequency antenna, wherein the passive entry/passive start sub-system is configured to facilitate access to a car and/or start of a car responsive to an authorized transponder being detected.

Embodiment 3: A car entry system, the car entry system comprising one or more of the passive entry/passive start sub-system of Embodiment 2 and the immobilizer sub-system of Embodiment 1.

We claim:

1. An accelerating ramp-down method, comprising:
   asserting, at a driver output coupled to an antenna, a first signal pulse with first defined signal properties, wherein the first defined signal properties include one or more of an amplitude, a phase, a frequency, a prior delay time, and a pulse shape;
   observing a phase information of an antenna signal, wherein the antenna signal is observed from an antenna current or an antenna voltage;
   asserting, at the driver output coupled to the antenna, successive signal pulses having different defined signal properties, wherein at least some of the different defined signal properties are based on the phase information of the antenna signal;
   detecting a stop condition based on the antenna signal; and
   asserting, at the driver output coupled to the antenna, a stop signal responsive to the stop condition.

2. The method of claim 1, wherein detecting the stop condition based on the observed antenna signal comprises observing that an observed antenna signal level is equal to or less than an antenna signal threshold.

3. The method of claim 1, wherein detecting the stop condition based on the observed antenna signal comprises observing a time period of an antenna signal outside an antenna signal range.

4. The method of claim 1, further comprising:
   observing one or more signal properties of the antenna signal and defining the successive signal pulses based on at least one of the one or more signal properties just before or during an antenna ramp-down, wherein the one or more signal properties of the antenna signal comprises a phase and an amplitude.

5. The method of claim 4, further comprising, between a first signal pulse of the successive signal pulses and a second signal pulse of the successive signal pulses:
   asserting a synchronization signal;
   observing the phase of the antenna signal;
   detecting a synchronization condition; and
   asserting the second signal pulse of the successive signal pulses responsive to detecting the synchronization condition.

6. The method of claim 4, further comprising:
   detecting a first condition associated with a frequency of the antenna signal;
   asserting a first signal pulse of the successive signal pulses at a first frequency responsive to the first condition;
   detecting a second condition associated with the frequency of the antenna signal; and
   asserting a second signal pulse of the successive signal pulses at a second frequency responsive to the second condition.

7. The method of claim 6, wherein the first frequency and the second frequency are selected to maximize the ramp-down of the antenna during the first signal pulse of the successive signal pulses and the second signal pulse of the successive signal pulses, respectively.

8. The method of claim 7, further comprising measuring the phase of the antenna signal by observing the antenna signal cross a synchronization threshold.

9. The method of claim 4, further comprising:
   observing the antenna signal;
   detecting a slow-down condition; and
   defining an amplitude of at least one pulse of the successive signal pulses responsive to the slow-down condition.

10. The method of claim 9, wherein the slow-down condition is selected to ensure a reliable detection of the stop condition.

11. The method of claim 1, further comprising defining a signal pulse shape of the successive signal pulses, wherein the signal pulse shape is configured to effect a ramp-down of an antenna current while an electromagnetic interference emission is low.

12. The method of claim 11, wherein the signal pulse shape begins and ends with a zero slope.

13. An integrated circuit comprising a configurable state machine and an antenna driver, wherein the configurable state machine is configured to control the antenna driver to:
   assert a first signal pulse with first defined signal properties, wherein the first defined signal properties include one or more of an amplitude, a phase, a frequency, a prior delay time, and a pulse shape;
   assert successive signal pulses having different defined signal properties, wherein at least some of the different defined signal properties are based on phase information of an antenna signal; and
   assert a stop signal responsive to a stop condition,
   wherein the configurable state machine is further configured to:
      observe phase information of the antenna signal, wherein the antenna signal is observed from an antenna current or an antenna voltage; and
      detect the stop condition responsive to the antenna signal.

14. The integrated circuit of claim 13, wherein the configurable state machine is configured to detect the stop condition responsive to an observed antenna signal level equal to or less than an antenna signal threshold.

15. The integrated circuit of claim 13, wherein the configurable state machine is configured to observe one or more signal properties of the antenna signal and operably control the antenna driver to define successive signal pulses responsive to at least one of the one or more signal properties just before or during an antenna ramp-down, wherein the one or more signal properties of the antenna signal comprises a phase and an amplitude.

16. The integrated circuit of claim 15, wherein the configurable state machine is configured to operably control the antenna driver to, between a first signal pulse of the successive signal pulses and a second signal pulse of the successive signal pulses:
   assert a synchronization signal;
   observe the phase of the antenna signal;
   detect a synchronization condition; and
   assert the second signal pulse of the successive signal pulses responsive to detecting the synchronization condition.

17. The integrated circuit of claim 15, wherein the configurable state machine is configured to detect a first condition associated with a frequency of the antenna signal and detect a second condition associated with the frequency of the antenna signal, wherein the configurable state machine is configured to control the antenna driver to:

assert a first signal pulse of the successive signal pulses at a first frequency responsive to the first condition; and assert a second signal pulse of the successive signal pulses at a second frequency responsive to the second condition.

18. The integrated circuit of claim 17, wherein the first frequency and the second frequency are selected to maximize antenna ramp-down during the first signal pulse of the successive signal pulses and the second signal pulse of the successive signal pulses, respectively.

19. The integrated circuit of claim 17, wherein the configurable state machine is configured to measure the phase of the antenna signal by observing the antenna signal cross a synchronization threshold.

20. The integrated circuit of claim 15, wherein the configurable state machine is configured to:

observe the antenna signal;

detect a slow-down condition; and define an amplitude of at least one pulse of the successive signal pulses responsive to the slow-down condition.

21. The integrated circuit of claim 20, wherein the slow-down condition is selected to ensure a reliable detection of the stop condition.

22. The integrated circuit of claim 13, wherein the configurable state machine is configured to define a signal pulse shape of the successive signal pulses, wherein the signal pulse shape is configured to effect a ramp-down of an antenna current while an electromagnetic interference emission is low.

23. The integrated circuit of claim 22, wherein the signal pulse shape begins and ends with a zero slope.

24. A system, comprising:

a low frequency antenna; and a radiofrequency (RF) device operably coupled to the antenna, wherein the RF device is configured to control the low frequency antenna to emit a modulated carrier wave that during at least one operational mode exhibits a shorter ramp-down period than a resonant ramp-down of the low frequency antenna.

25. The system of claim 24, wherein the RF device comprises a processor and an antenna driver, the antenna driver having at least one interface configured to be operably coupled to the low frequency antenna.

26. The system of claim 25, wherein the processor is configured to control the antenna driver during the at least one operational mode to:

assert a first signal pulse with first defined signal properties, wherein the first defined signal properties include one or more of amplitude, phase, frequency, prior delay time, and pulse shape; and assert successive signal pulses having different defined signal properties, wherein at least some of the different defined signal properties are based on phase information of an antenna signal.

27. The system of claim 24, wherein the RF device is configured to provide a driver signal to the low frequency antenna that is between about 100 kHz and 150 kHz.

28. The system of claim 24, further comprising an integrated circuit package, wherein the integrated circuit package comprises the RF device.

29. The system of claim 28, further comprising a printed circuit board, the printed circuit board comprising the integrated circuit package and the low frequency antenna.

* * * * *